United States Patent [19]

Nishizawa et al.

[11] Patent Number: 5,326,042
[45] Date of Patent: Jul. 5, 1994

[54] SEAT BELT PRETENSIONER

[75] Inventors: Muneo Nishizawa; Tetsuya Hamaue, both of Shiga, Japan

[73] Assignee: Takata Corporation, Tokyo, Japan

[21] Appl. No.: 990,123

[22] Filed: Dec. 14, 1992

[30] Foreign Application Priority Data

Dec. 17, 1991 [JP] Japan .................................. 3-353003

[51] Int. Cl.$^5$ ...................... B60R 22/46; B65H 75/00
[52] U.S. Cl. .................................................. 242/374
[58] Field of Search ......... 242/107, 107.4 R, 107.4 A, 242/107.4 B; 280/806; 297/478, 480

[56] References Cited

U.S. PATENT DOCUMENTS 4,750,686 6/1988 Fohl ..................................... 242/107

FOREIGN PATENT DOCUMENTS 1119454 5/1989 Japan .
9009910 9/1990 PCT Int'l Appl. .................. 280/806

Primary Examiner—John M. Jillions
Attorney, Agent, or Firm—Brumbaugh, Graves, Donohue & Raymond

[57] ABSTRACT

A seat belt pretensioner of the type which rotates the take-up shaft of a retractor in the belt-winding direction so as to wind a length of the belt onto the retractor reel includes a driven gear connected to the retractor take-up shaft and a driving gear connected to a power source, the driving gear normally being held in clearance from the driven gear in the set condition of the pretensioner and being displaced and rotated upon operation of the power source to engage it with the driven gear and to drive the driven gear in rotation. The teeth of one of the gears have addenda that diverge from the addendum circle in the direction of the root circle and in a direction with respect to the direction of rotation of the driving gear such as to facilitate movement of the driving gear into driving engagement with the driven gear in the event of a collision of the addenda of the two gears.

1 Claim, 6 Drawing Sheets

SEAT BELT PRETENSIONER

BACKGROUND OF THE INVENTION

The present invention relates to a vehicle seat belt pretensioner and, in particular, to a pretensioner of the type that pretensions a seat belt by rotating the take-up shaft of a belt retractor.

In some vehicle seat belt systems, a pretensioner is provided for tightening the belt at the instant of a collision so that it firmly engages the occupant before the occupant is thrown forward. One type of seat belt pretensioner is disclosed in the Japanese Patent Laid-Open Publication No.1-119454.

In that pretensioner, a pulley is connected to a take-up shaft of a seat belt retractor through a coupling device, and the pulley is rotated by a cable, which is wound around it and is pulled by means of a drive unit (power source). The coupling device comprises a pair of gears, one of which is fixed on the retractor take-up shaft and the other of which is fixed on the pulley. The pulley is supported on a guide unit in the form of a pivoting arm. In the set position, the guide unit is maintained by a shear pin in a position in which the gears are not engaged. When the drive unit is operated, the shear pin is broken stepwise, first to allow the guide unit to pivot and then to allow the pulley to rotate. After the two gears are engaged with each other by swinging of the guide unit, the pulley is rotated and imparts rotation to the take-up shaft so as to wind a length of the belt onto the belt reel.

In a pretensioner of the type described above, a high power is applied instantaneously, in the order of milliseconds, and St is essential that the gears be engaged very rapidly in order to transmit rotation to the take-up shaft as soon as possible after the power source is activated. One significant cause of delay is a collision between the addenda of the gears when the driving gear moves toward engagement with the driven gear. Such a collision results in a sliding of the addendum of one gear along the addendum of the other gear and a cessation of movement of the driving gear into meshing engagement with the other gear, with a consequent significant loss of time and energy.

SUMMARY OF THE INVENTION

To solve the above problem, it is an object of the present invention to provide a seat belt pretensioner in which smooth movement of the driving gear into engagement with the driven gear is ensured, even when the addenda of the gears collide at the inception of their engagement. By ensuring smooth movement toward engagement, the pretensioner of the present invention minimizes the time delay between operation of the power source and the commencement of rotation of the belt reel to pretension the belt at all times.

To attain the above object, there is provided, in accordance with the present invention, a seat belt pretensioner of the type which rotates the take-up shaft of a retractor in the belt-winding direction so as to wind a length of the belt onto the retractor reel. The pretensioner includes a driven gear connected to the retractor take-up shaft and a driving gear connected to a power source. The driving gear is normally held in clearance from the driven gear in the set condition of the pretensioner and is displaced and rotated upon operation of the power source to engage it with the driven gear and to drive the driven gear in rotation. The present invention is characterized in that the teeth of one of the gears have addenda that diverge from the addendum circle in the direction of the root circle and in a direction with respect to the direction of rotation of the driving gear such as to facilitate movement of the driving gear into driving engagement with the driven gear in the event of a collision of the addenda of the two gears.

In the pretensioner of the type of the present invention, the driving gear is moved toward the driven gear by operation of the power source. If the addenda of the gears collide before the gears engage, the driving gear stops moving toward the driven gear for only an instant and then resumes movement toward full engagement. No significant delay can occur between the stoppage of movement and the resumption of movement toward engagement. The present invention, by having modified addenda on the teeth of one of the gears, minimizes the time loss in the event of a collision of the addenda by facilitating continued, relatively smooth movement of the driving gear toward full engagement with the driven gear.

For a better understanding of the invention, reference may be made to the following description of exemplary embodiments, taken in conjunction with the accompanying drawings.

DESCRIPTION OF THE EMBODIMENTS

Figure 1:
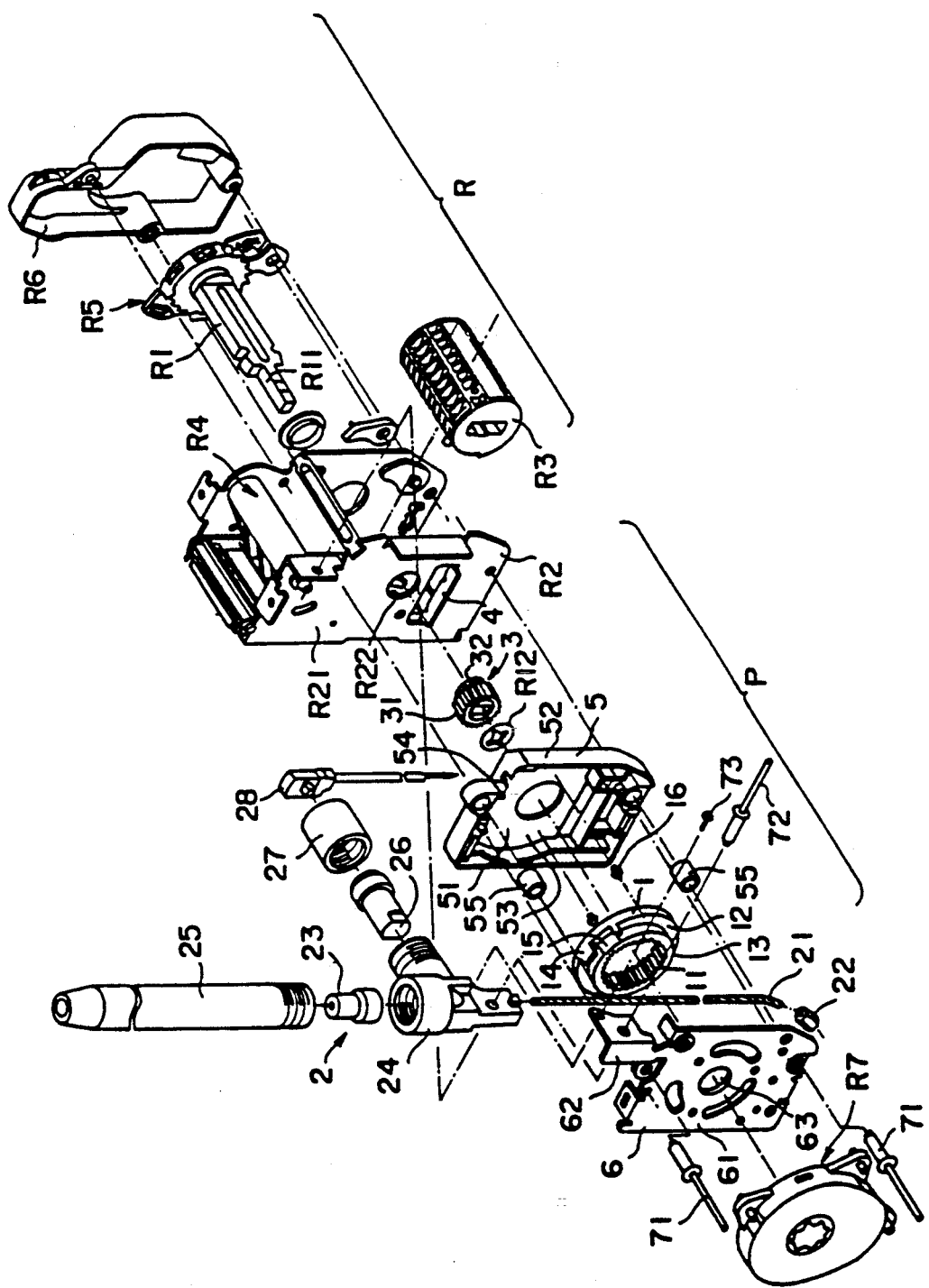
FIG. 1 is a exploded perspective view of a first embodiment of the present invention, in which the pretensioner is integrated with a retractor.

Referring to FIG. 1, a pretensioner P comprises a pinion 3 connected to a seat belt take-up shaft R1 of a retractor R and serving as a driven gear, and a pulley 1 connected to a power source 2 and serving as a driving gear. The pinion 3 and the pulley 1 are engaged with each other by operation of the power source 2, and the power of the power source 2 is transmitted to the take-up shaft R1 through these components. Thus, a seat belt (not shown) is tightened by winding a segment of it onto the take-up shaft R1.

Figure 2:
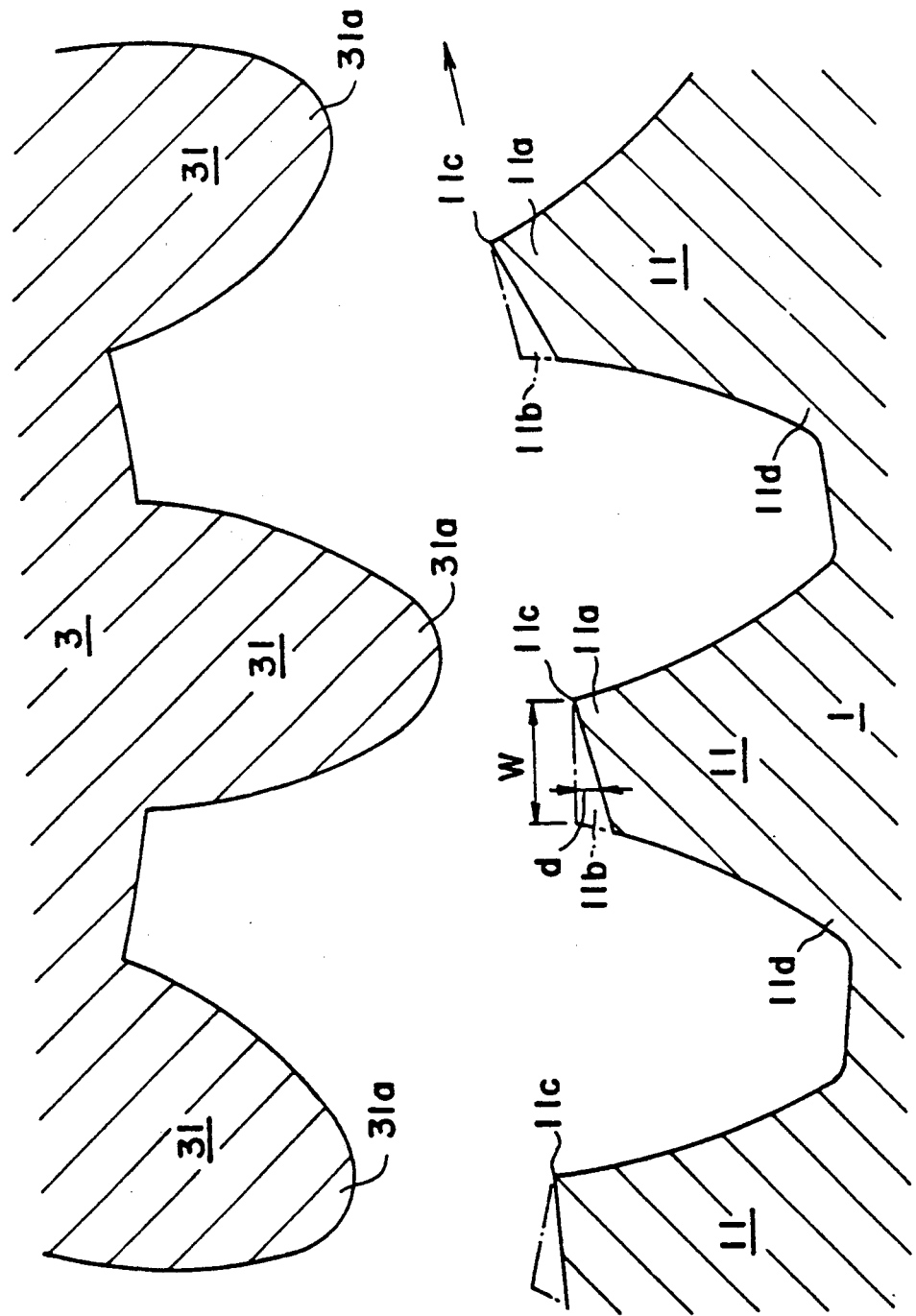
FIG. 2 is an enlarged cross-sectional side view of portions of the gears of the first embodiment of the invention.

As shown in FIG. 2, either the pinion 3 or the pulley 1 (the pulley 1 in the present example), has teeth 11 in which the addenda, i.e., tip portions, are modified to enhance movement toward engagement in the event that an addendum 11a of a pulley tooth collides with an addendum 31a of a pinion tooth 3. In the illustrated embodiment, the modified teeth 11 are on the pulley 1, which serves as the driving gear. The teeth 11 have addenda 11a that diverge from a tip 11c at the addendum circle in the direction of the root circle and in a direction with respect to the direction of rotation of the driving gear such as to facilitate movement of the driving gear into driving engagement with the driven gear in the event of a collision of the addenda of the two gears. (Hereinafter, references to the "front" and "back" of the teeth are with respect to the rotating direction of the driving gears.) The desired shape of the modified teeth 11b will be more clearly understood from the description below of the operation of the pretensioner. The modified teeth 11 have tips formed by cutting off wedge portions 11b of a depth d and a width w from the normal tooth shape, leaving a surface that diverges gradually toward the root circle and from a front edge 11c at the addendum circle toward the back. When the modified teeth are formed on the pinion 3, i.e., driven gear, the tips are, likewise, formed by cutting off a piece approximately in the form of a wedge, leaving a tip surface that diverges in the direction of the root circle from a rear edge tip at the addendum circle toward the front edge.

Referring again to FIG. 1, the seat belt retractor R may be of any suitable construction, many of which are well known. In the embodiment, the retractor R has a U-shaped frame R2, a reel R3, onto which the seat belt (not shown) is wound, and a clamp assembly R4 for clamping the belt. A reel-shaft locking mechanism R5 is mounted on one side flange of the frame R2 and is covered by a cover R6. A spring unit R7 for winding the belt onto the reel is provided on the other side flange of the frame. The pretensioner mechanism P of the present invention is arranged between the side flange R21 of the frame R2 and the spring unit R7 and comprises a pinion 3, a pulley 1, a housing 5, a retainer 6 for supporting the spring unit R7, and the power source 2, which is mounted on the retainer 6.

The housing 5 has a side wall 51 and a peripheral wall 52, which form a recess 53 that is of substantially rectangular shape for receiving the pulley and is of a box shape with one side open. At the center of the side wall 51, there is a hole for receiving the pinion 3, and a part of the peripheral wall 52 is cut out to form a notch 54 for the cable 21 of the power source. The retainer 6, which covers the open side of the housing 5, is of generally planar shape and is made by stamping. The spring unit R7 is attached to the planar body 61, and the power source 2 is attached on a flange 62 that extends from the edge of the body 61. The housing 5 is mounted on the side flange R21 of the frame R2 through spacer collars 55, and the housing 5 and the retainer 6 are attached to the frame R2 by rivets 71.

The pinion 3 has external teeth 31, is engaged with and fixed on a rectangular portion R11 on the end of the take-up shaft R1, and is located approximately at the center of the pulley-receiving recess 53 of the housing 5. A circular cylindrical boss 32 on the inner end of the pinion (where there are no teeth) is rotatably supported in a hole R22 in the side flange R21 of the frame R2 and serves as a bushing for supporting the take-up shaft R1 on the frame R2. The pinion 3 is retained by a stopper R12 that is engaged with the rectangular shaft portion R11. The rectangular shaft portion R11 extends outwardly beyond the pinion 3 and through a shaft-receiving hole 63 in the retainer 6. The inner end of a spiral spring (not shown) of the spring unit R7 is attached to the end of the shaft portion R11.

The pulley 1 is annular and has internal teeth 11 arranged to engage the teeth 31 of the pinion 3. The inner diameter of the pulley 1 is larger than the diameter of the pinion 3. The pulley 1 does not have an outer side flange. Its inner side flange 12 has a planar wall 13 along most of its circumference. A projection 14 extends outwardly from the flange and has a notch 15 that receives a wire end 22, which is crimped on the end of a cable 21. The wire end 22 fastens the end of the cable 21 to the pulley 1. The cable 21 is wound by about ¾ turn around the pulley 1, extends out of the housing 5 through the notch 54, passes through a T-piece 24 and is attached to a piston 23 of the power source 2.

The power source 2, which is of a known type and is mounted by means of the T-piece 24 on the bracket 62 by a rivet 72 and a screw 73, comprises a cylinder 25, a gas generator 26 composed of gunpowder and an ignitor, a keeper 27, and a connector 28 of a starting device (not shown).

Figure 3A:
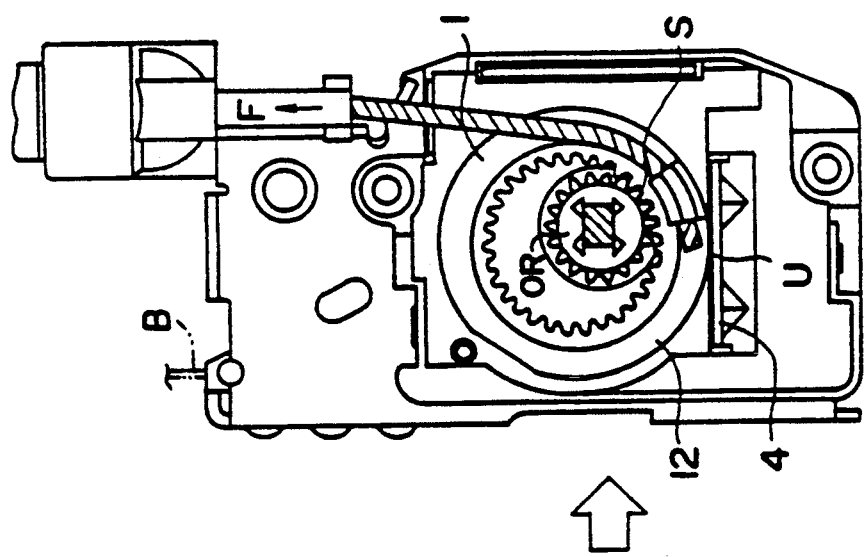
FIGS. 3A, 3B and 3C are side elevational views of the pretensioner, illustrating its operation in sequence.

In the following description of the operation of the embodiment, the positions (up and down, left and right) in the drawing figures are with respect to the figures to facilitate explanation, but the orientation of the pretensioner P is not limited to these positions. As shown in FIG. 3A, which shows the "set" condition, the pulley 1 is positioned downwardly within the pulley-receiving recess 53 with its inner side flange 12 supported by the guiding means 4, which extends into the pulley-receiving recess 53. The flange 12 is fastened to the side wall 51 of the housing 5 by shear pins 16 (FIG. 1) at two points (left and right). In that position, the teeth 31 of the pinion 3 and the internal teeth 11 of the pulley 1 are not engaged and are at a predetermined clearance L. The take-up shaft R1 can operate under the control of the spring unit R7 and the locking mechanism R5 in the normal manner.

Figure 3B:
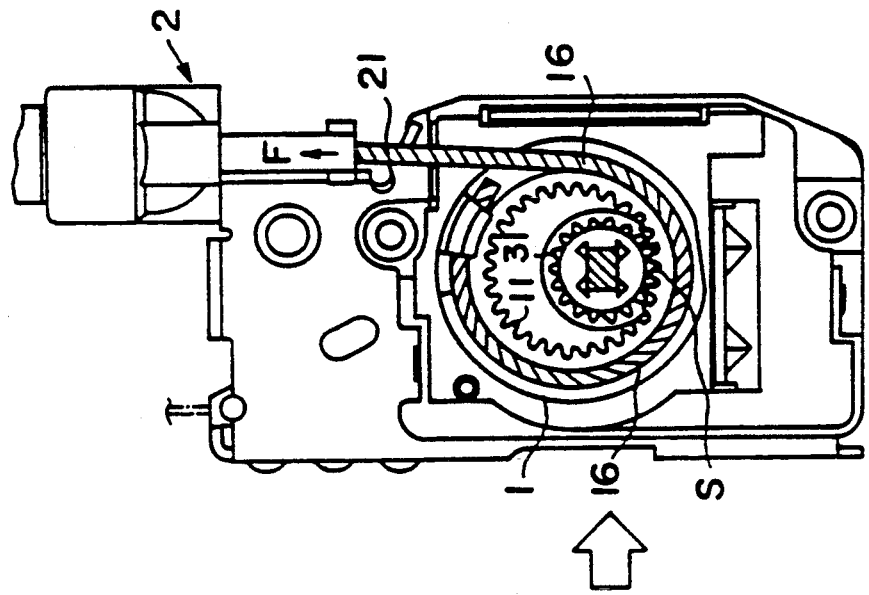

When a high acceleration occurs, such as in a vehicle collision, in the set condition, it is detected by a sensor (not shown), and the power source 2 is operated by a starting device (not shown). As shown in FIG. 3B, the cable 21 is pulled by a pulling force F in a direction shown by the arrow in the figure. The shear pins 16 break, and the pulley with the cable 21 wound on it starts rotating and is pulled upward. The pulley teeth 11 engage the pinion teeth 31 at a lower engaging point S. Because the pulley 1 is not restricted in upward and lateral movements, even when the tips of the teeth 31 and 11 collide, the engagement of the pinion teeth 31 and the pulley teeth 11 is assured since the pulley is moved laterally as it is rotated. Exactly how the driving engagement of the driving gear with the driven gear is attained depends on the relative phases of the gears when they make contact.

Figure 3C:
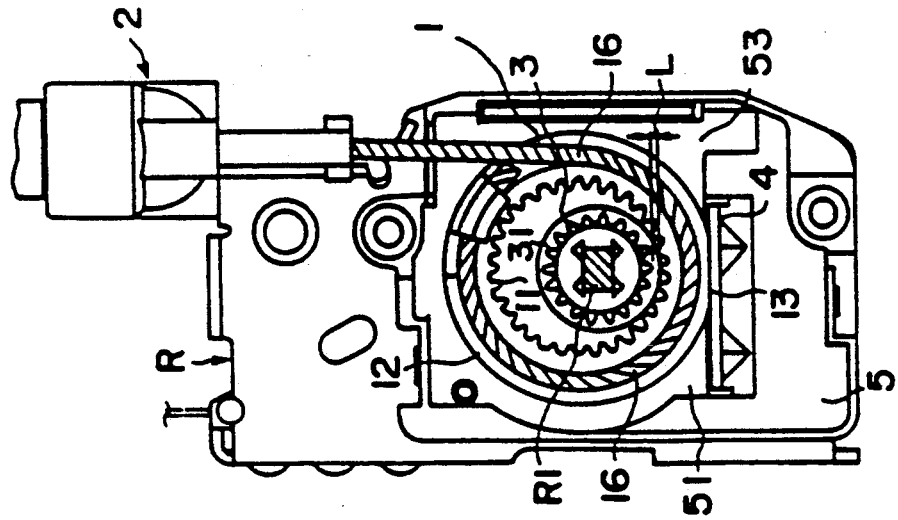

When contact occurs without a collision of the addenda of the pinion teeth 31 with the addenda of the pulley teeth 11, the pulling force F acts as a moment to rotate the pulley 1 with the engaging point S between the engaged teeth as a center, as shown in FIG. 3C. The peripheral surface of the flange 12 of the pulley 1 engages and is supported by the upper surface of the guiding means 4, which constitutes a fixed reaction support point U. As a result, the position of the pulley 1 is maintained by the engaging point S and the reaction support point U and the pulley is rotated around a virtual center OR with the upper surface of the guiding means 4 as a guide. In this condition of full engagement, which is always ultimately attained, the driving engagement is maintained by a force component acting on the pulley at the contact point S between the pulley and the pinion and directed toward the center of the pinion 3.

Figure 4:
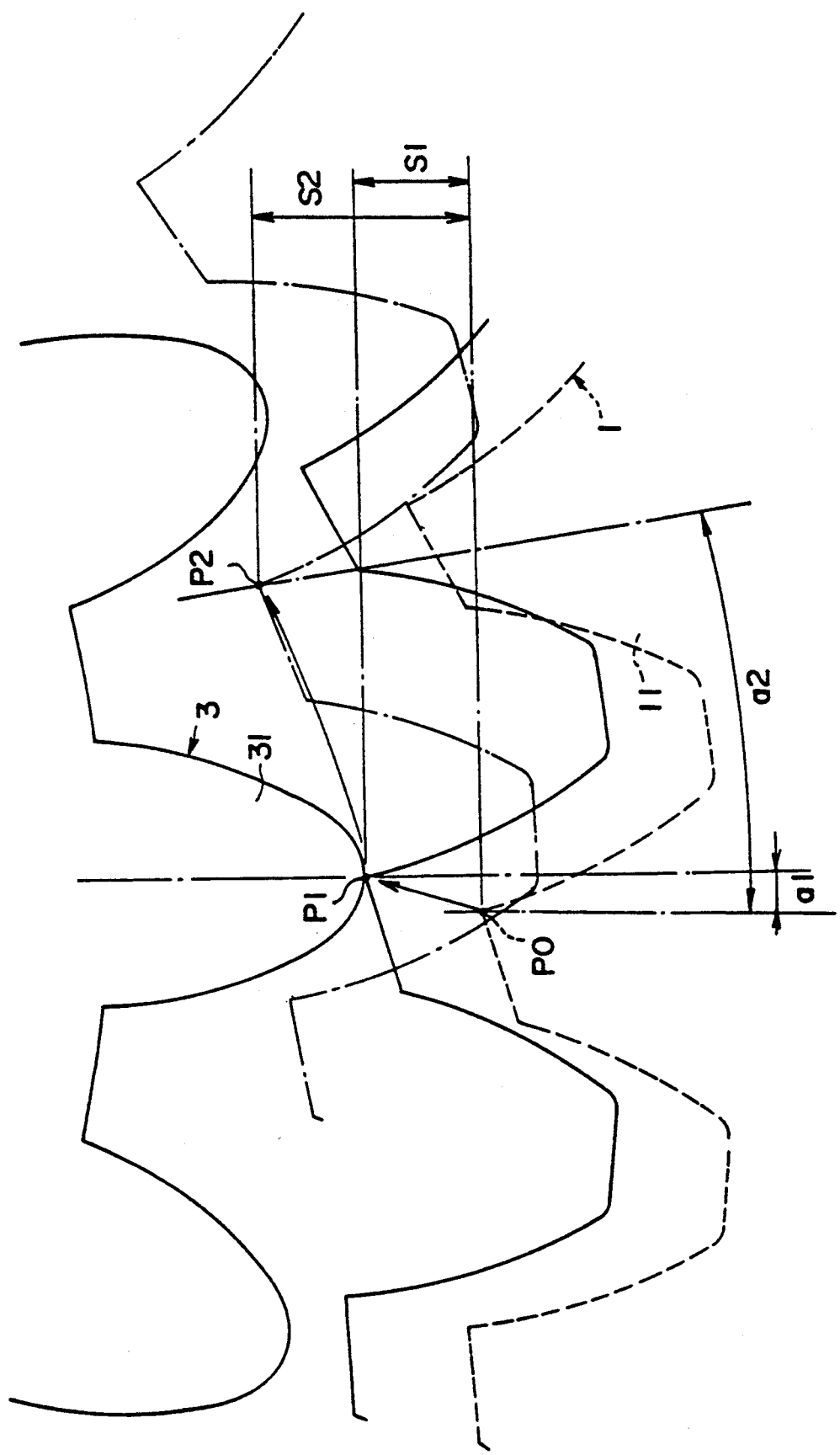
FIG. 4 is an enlarged view of segments of the gears of the first embodiment, showing their operation in sequence.

If the contact between the pulley and the pinion is between addenda of the teeth, the modified addenda facilitate rapid full engagement. In one mode of operation, as shown in FIG. 4, a tooth of the pulley 1, which was initially at the set position shown by the dashed line, moves through an angle al and a distance S1 under the force applied by the power source 2 acting through the cable 21, thus moving the tip of a tooth 11 of the pulley from position P0 to position P1 in which it collides with a tooth 3 of the pinion. For an instant, the upward movement of the pulley is stopped upon the tip to tip collision, but the pulley continues to rotate, and upward movement of the pulley starts again as the tip of the tooth 11 slides along the tip of the tooth 3. The modified addendum of the tooth 11 thus permits the resumption of movement of the pulley toward the pinion with virtually no delay after the collision. Without the modified addenda, the pulley could not resume upward movement following a collision until the pulley has rotated through a distance equal to the width W (see FIG. 2) of an addendum of a tooth 11. Accordingly, movement of the pulley to the position shown by dot-dash lines in FIG. 4 by rotation through the angle a2 and upward displacement through the distance s2, thus moving the front of the tooth from position P1 to position P2, takes place with a minimum of hindrance by the collision and a minimum of delay. Once the pulley attains the position shown in dot-dash lines, full engagement takes place in the manner described above.

Figure 5A:
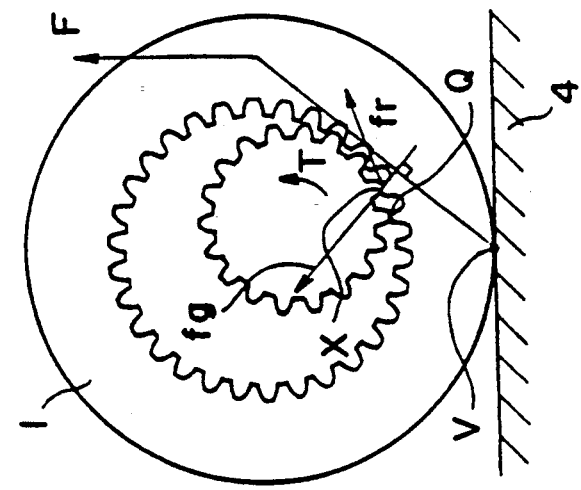
FIGS. 5A, 5B and 5C are views of the gears and illustrate another aspect of the operation of the first embodiment in sequence.
Figure 5B:
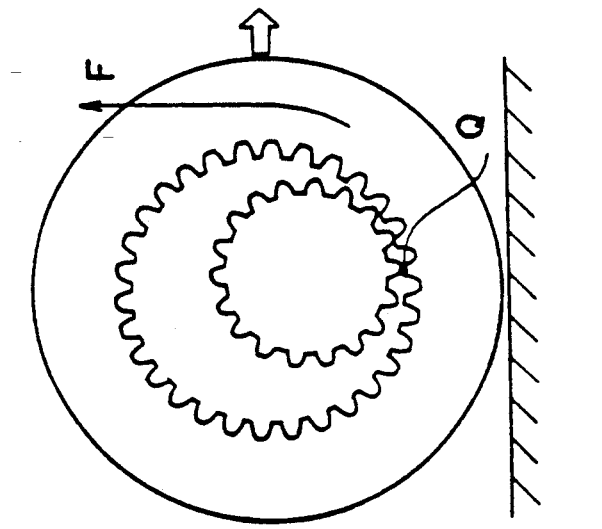
Figure 5C:
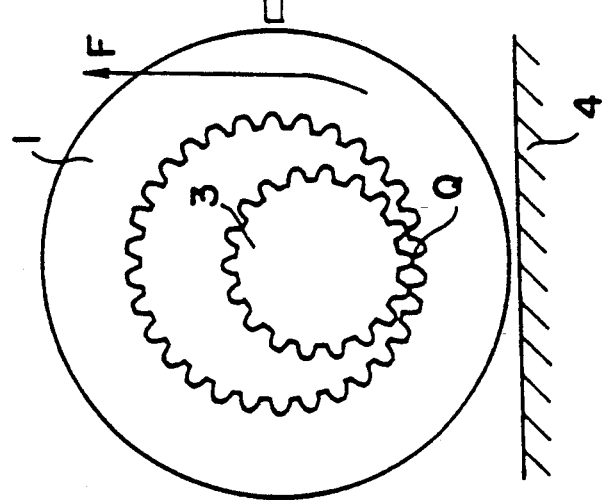

Referring to FIG. 5A, another form of collision between addenda of the pulley teeth and pinion teeth may occur at a point Q, in which the tip of a tooth 11 collides with a point of the back of a tooth 31 near the addendum circle of teeth 31 such that both rotation and upward displacement of the pulley are stopped. In that event, as shown in FIG. 5B, a rotational moment is imparted to the pulley about the point Q by the force F. The pulley is pushed down by the moment, which brings the lowermost point on its periphery into engagement with the guiding means 4 at point V. Next, a rotational moment is imposed by the force F on the pulley about point V. Because that moment is far greater than the resisting torque T relative to the center of the pulley, the addendum of the pulley tooth next ahead of the contact point Q engages the next pinion tooth at point X, and a force "fr" in a direction to rotate the pinion is applied at point X to the pinion by the pulley. A force component "fg" in a direction to maintain engagement between the pulley tooth and the pinion tooth also results. Accordingly, the desired driving engagement between the pulley and the pinion is established and maintained, as described above and shown in FIG. 3C.

Following full engagement of the pulley teeth with the pinion teeth, rotation of the pulley 1 is transmitted to the take-up shaft R1 through the pinion 3, and a length of the belt B is wound onto the retractor reel R3. The winding of the belt takes place instantaneously before any forward movement of the occupant due to inertia.

Figure 6:
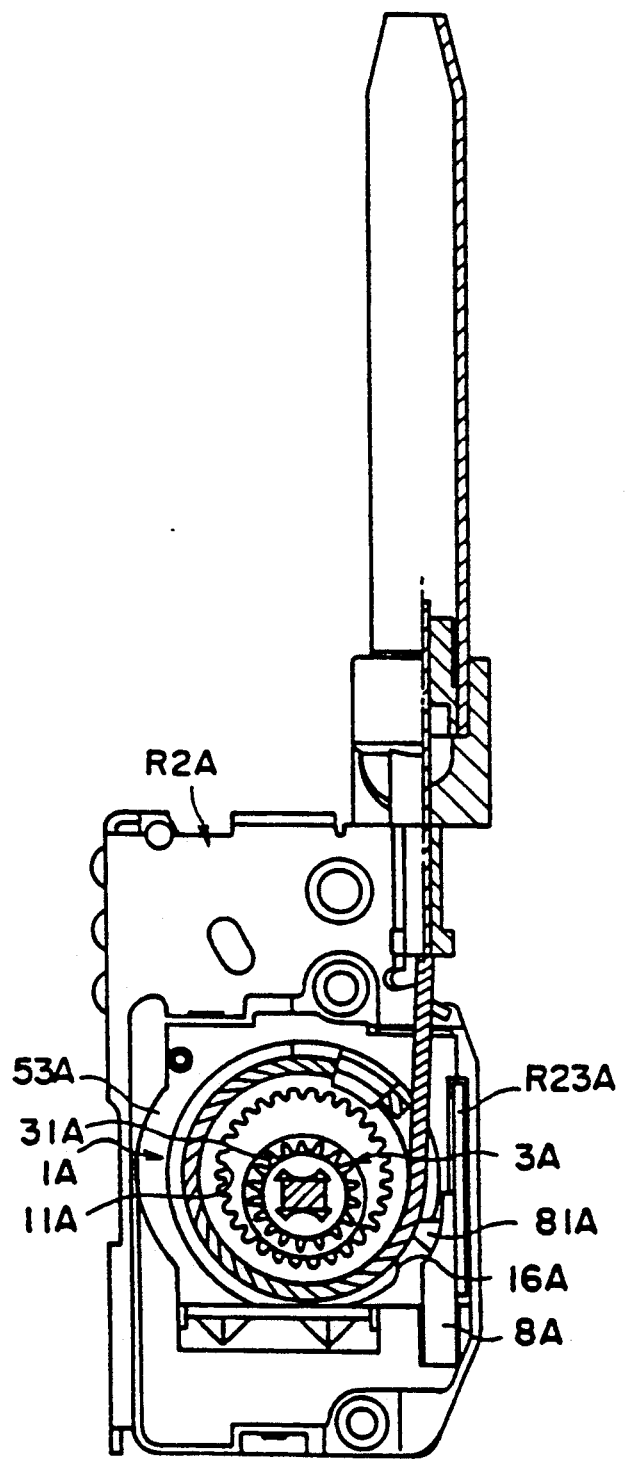
FIG. 6 is a partial cross-sectional side view of a second embodiment, which has a modified guide means for the pulley.

FIG. 6 shows a second embodiment of a pretensioner, according to the invention, in which engagement of the pulley with the pinion is maintained by a fixed guide and a movable guide. The arrangement is for the most part the same as that of the first embodiment, as described above, except that a spacer 8A functioning as a movable guide is provided in the side of a pulley receiving recess 53A. The spacer 8A has a pawl 81A that is engaged in a notch 16A in the pulley 1A. When the pulley 1A is rotated, the spacer 8A is lifted up by the engagement with the notch 16A and is pulled between the pulley 1 and a projection R23A of a base R2A. Thus, the engagement of the teeth 11A of the pulley 1A with the teeth 31A of the pinion 3A is maintained. In this second embodiment, the engagement of the two gears at their initial contact is achieved in the same manner as in the first embodiment.

The two embodiments of the present invention described above are merely exemplary, and the invention is not limited to those embodiments. Various changes and modifications of the embodiments will be apparent to those skilled in the art and are intended to be included within the scope and the spirit of the invention, as set forth in the claims. For example, in the embodiments, the driving gear and driven gear are designed as internally engaged gears having teeth on their inner and outer peripheries, respectively, and the driving gear is not supported on a shaft. The driving gear and driven gear may be designed as externally engaging gears, or the driving gear may be carried by a shaft.

Thus, it is possible, according to the present invention, to smoothly and quickly achieve engagement of gears as a means for transmitting the power of the power source to the seat belt take-up shaft. Accordingly, it is possible to provide a pretensioner in which, even when the addenda of the gears collide during engagement, smooth relative movement in the engaging direction of the two gears is ensured, the engagement can be accomplished quickly at all times, and time delay in the operation can be minimized.

We claim:

1. A seat belt pretensioner of the type which rotates the take-up shaft of a retractor in the belt-winding direction so as to wind a length of the belt onto the retractor reel and including a driven gear connected to the retractor take-up shaft and a driving gear connected to a power source, the driving gear normally being held in clearance from the driven gear in the set condition of the pretensioner and being displaced and rotated upon operation of the power source to engage it with the driven gear and to drive the driven gear in rotation, characterized in that the teeth of one of the gears have addenda having top land surfaces that diverge from the addendum circle in the direction of the root circle and in a direction with respect to the direction of rotation of the driving gear such as to facilitate movement of the driving gear into engagement with the driven gear in the event of a collision of the addenda of the two gears, the top land surface of each tooth of said one gear being a surface that is left when a generally wedge-shaped portion defined by a first edge at the intersection of one face and the addendum circle, a second edge spaced apart circumferentially from the first edge and at the intersection of the other face and the addendum circle, and a third edge on the other face and spaced apart from the addendum circle in the direction of the root circle is removed from a normal addendum.

* * * * *